(12) United States Patent
Chen et al.

(10) Patent No.: US 11,035,538 B2
(45) Date of Patent: Jun. 15, 2021

(54) LENS STRUCTURE AND VEHICLE LAMP SYSTEM

(71) Applicant: HASCO VISION TECHNOLOGY CO., LTD., Shanghai (CN)

(72) Inventors: Zhaoyu Chen, Shanghai (CN); Guomin Xu, Shanghai (CN); Ziwei Chen, Shanghai (CN); Jin Shen, Shanghai (CN)

(73) Assignee: HASCO VISION TECHNOLOGY CO., LTD, Shanghai (CN)

( * ) Notice: Subject to any disclaimer, the term of this patent is extended or adjusted under 35 U.S.C. 154(b) by 400 days.

(21) Appl. No.: 16/069,586

(22) PCT Filed: Apr. 25, 2018

(86) PCT No.: PCT/CN2018/084383
§ 371 (c)(1),
(2) Date: Jul. 12, 2018

(87) PCT Pub. No.: WO2019/196136
PCT Pub. Date: Oct. 17, 2019

(65) Prior Publication Data
US 2020/0378576 A1 Dec. 3, 2020

(30) Foreign Application Priority Data
Apr. 13, 2018 (CN) .......................... 201810330363.X

(51) Int. Cl.
*F21S 41/265* (2018.01)
*F21S 41/26* (2018.01)
*F21V 5/04* (2006.01)

(52) U.S. Cl.
CPC .............. *F21S 41/265* (2018.01); *F21S 41/26* (2018.01); *F21V 5/045* (2013.01)

(58) Field of Classification Search
CPC ......... F21V 5/045; F21S 41/26; F21S 41/265; G02B 3/02; G02B 3/04
See application file for complete search history.

(56) References Cited

U.S. PATENT DOCUMENTS 7,410,279 B2 * 8/2008 Kawashima .......... F21S 41/155
362/507
9,638,386 B2 * 5/2017 Iwasaki ................... F21V 5/045
2007/0127253 A1 6/2007 Kawashima

FOREIGN PATENT DOCUMENTS

CN 105066060 A 11/2015
CN 204853338 U 12/2015
(Continued)

OTHER PUBLICATIONS

International Search Report and Written Opinion for International Patent Application No. PCT/CN2018/084383 dated Feb. 11, 2019, 10 pages.

*Primary Examiner* — Robert J May
(74) *Attorney, Agent, or Firm* — Dinsmore & Shohl LLP

(57) ABSTRACT

A lens structure includes a lens body; an outer surface of the lens body is provided as a single curved surface; and an inner surface of the lens body is provided thereon with at least two inner curved surfaces that are continuously connected. In the present solution, through the design of the plurality of inner curved surfaces, the light pattern and the energy distribution can be controlled flexibly, the applicability of the lens design is maximally greatly improved, and meanwhile, a truly feasible solution is provided for the defect where in some scenes it is impossible for the existing conventional structure to distribute light. In addition, multiple functions may be implemented at the same time, such as, low beam, high beam, bending and fog lamp; and multiple functions are combined into one lens module for implementation.

18 Claims, 3 Drawing Sheets

(56) References Cited

FOREIGN PATENT DOCUMENTS

| | | |
|---|---|---|
| CN | 105589991 A | 5/2016 |
| CN | 207364926 U | 5/2018 |
| CN | 207661714 U | 7/2018 |

\* cited by examiner

LENS STRUCTURE AND VEHICLE LAMP SYSTEM

CROSS-REFERENCE TO RELATED APPLICATIONS

The present application is the National Phase entry of International Patent Application No. PCT/CN2018/084383 filed on Apr. 25, 2018 which claims the priority to a Chinese patent application No. CN201810330363.X, filed with the State Intellectual Property Office on Apr. 13, 2018 and entitled "Lens Structure and Vehicle Lamp System", the content of which is incorporated herein by reference in its entirety.

TECHNICAL FIELD

The present disclosure relates to the technical field of vehicle lamp optical systems, and in particular to a lens structure and a vehicle lamp system.

BACKGROUND ART

At present, in the vehicle lamp optical system for vehicles, PES (poly ellipsoid system) lens is an extremely important component of the optical system, and the commonly used one is a single light source hyperboloid lens.

It is difficult for the traditional lens structure designs to meet the current complex requirements of light distribution.

SUMMARY

An object of the present disclosure is to provide a lens structure suitable for scenes with multi-curved surfaces and multi-light sources, which lens structure maximally achieves a flexible control of the light pattern and energy, improves heat generation, optimizes the spatial structure, enhances the stability of the optical system, and especially ameliorate the defect where in some cases it is difficult for the traditional lens structure to implement light distribution.

Another object of the present disclosure is to provide a vehicle lamp system in the above-described lens structure.

In order to achieve the above objects, the present disclosure provides the technical solutions as follows.

A first aspect of the present disclosure provides a lens structure including a lens body.

An outer surface of the lens body is provided as a single curved surface, and an inner surface of the lens body is provided thereon with at least two inner curved surfaces that are continuously connected.

Further, the outer surface is an arc curved surface, and the inner surface is provided thereon with three inner curved surfaces.

Further, at least one of the inner curved surfaces is determined according to one light source focal point.

Further, a plurality of the inner curved surfaces are arranged in multiple rows and columns.

Further, the outer surface of the lens body is an arc curved surface, the inner surface includes a first inner surface, a second inner surface, and a third inner surface, and the first inner surface, the second inner surface and the three inner surface form a groove.

Further, the first inner surface and the third inner surface are provided symmetrically around a central axis of the second inner surface; or, the first inner surface, the second inner surface, and the third inner surface are arranged irregularly.

Further, a surface area of the second inner surface is greater than a surface area of the first inner surface and a surface area of the third inner surface, respectively; or, the surface area of the second inner surface is less than the surface area of the first inner surface and the surface area of the third inner surface, respectively.

Further, the lens body is in a shape of Yuanbao (a Chinese shoe-shaped gold/silver ingot which is a currency from ancient China and has a shape of shoe or boat with a dome in the middle), where the outer surface consists of an outer side surface and a bottom surface of the Yuanbao, and the inner surface refers to an inner side surface of the Yuanbao.

Further, the inner surface is divided into a first inner surface, a second inner surface and a third inner surface, and the first inner surface, the second inner surface and the third inner surface each are provided thereon with at least one inner curved surface.

Further, the first inner surface, the second inner surface, and the third inner surface are arranged irregularly; and a surface area of the second inner surface is greater than a surface area of the first inner surface and a surface area of the third inner surface, respectively.

Further, the first inner surface and the third inner surface are each provided with N inner curved surfaces; and the second inner surface is provided with M inner curved surfaces, where N and M are both positive integers greater than 1, and M is greater than N.

A lens structure includes a lens body.

The lens body has an outer surface and an inner surface opposite to each other.

The outer surface is configured as a single curved surface, and the inner surface is provided thereon with at least two inner curved surfaces.

Further, the inner surface includes a plurality of sub-surfaces that are interconnected, and adjacent ones of the sub-surfaces have a preset included angle.

The sub-surface has at least one inner curved surface.

Further, the inner surface includes at least three sub-surfaces that are interconnected, and adjacent ones of the sub-surfaces have a preset included angle.

A plurality of the sub-surfaces, in combination, form a groove recessed toward the outer surface.

Further, the sub-surfaces are each provided thereon with a plurality of inner curved surfaces.

Further, at least one of the inner curved surfaces is determined according to one light source focal point.

Further, a plurality of the inner curved surfaces are arranged in multiple rows and columns.

Further, the outer surface is an arc curved surface.

Moreover, the arc curved surface protrudes in a direction away from the inner surface.

A second aspect of the present disclosure provides a vehicle lamp system including the lens structure described in any one of the above technical solutions.

The lamp system provided by the second aspect of the present disclosure is provided with the lens structure provided by the first aspect, and thus has all the beneficial effects of the lens structure provided by the first aspect, which will not be described repeatedly herein.

With the above technical solution, the present disclosure has the following beneficial effects:

The lens structure provided by the present disclosure, in which the outer surface of the lens body is provided as a single curved surface, and the inner surface of the lens body is provided thereon with at least two inner curved surfaces that are continuously connected, is capable of flexibly controlling the light pattern and the energy distribution, greatly improves the applicability of the lens design, and at the same time, provides a truly feasible solution to the defect where in some scenes it is impossible for the existing conventional structure to distribute light.

Multiple functions may be implemented at the same time, such as, low beam, high beam, bending, fog lamp, and so on; and multiple functions are combined into one lens module for implementation.

Additional aspects and advantages of the present disclosure will become apparent in the following description, or may be learned through the practice of the present disclosure.

BRIEF DESCRIPTION OF DRAWINGS

Drawings required for use in the description of embodiments or of the prior art will be introduced briefly below in order to explain the technical solutions of the embodiments of the present disclosure or of the prior art more clearly. It will be apparent that the drawings in the description below are merely illustrative of some embodiments of the present disclosure; and a person ordinary skilled in the art can also obtain, from these drawings, other drawings without using creative efforts.

REFERENCE NUMERALS

Figure 1:
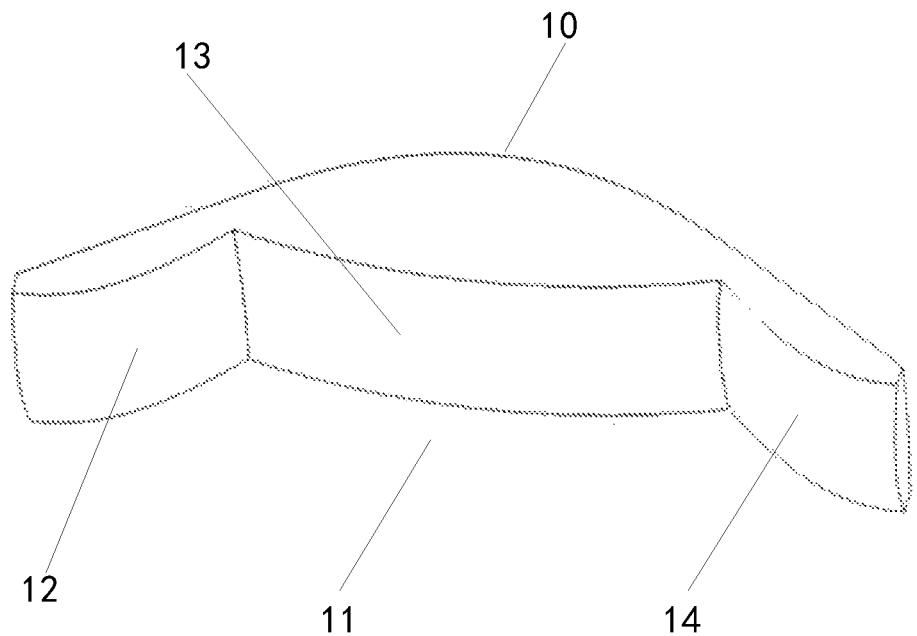
FIG. 1 is a structural schematic view of a lens structure provided by Embodiments of the present disclosure.

10—outer surface, 11—inner surface, 12—first inner surface, 13—second inner surface, 14—third inner surface, 15—light source focal point, 16—reflection surface, 17—inner curved surface, 20—first lens, 201—first reflection surface, 21—second lens, 211—second reflection surface.

DETAILED DESCRIPTION OF EMBODIMENTS

The technical solutions of the technical solutions of the present disclosure will be described clearly and completely in combination with the drawings. It is apparent that the embodiments described are some, but not all of the embodiments of the present disclosure. All the other embodiments, obtained by a person skilled in the art in light of the embodiments of the present disclosure without using creative efforts, will fall within the scope of the present disclosure as claimed. It should be noted that the embodiments of the present application and the features in the embodiments may be combined with one another without conflicting.

In the description of the present disclosure, it should be noted that orientation or positional relations indicated by terms such as "center", "up", "down", "left", "right", "vertical", "horizontal", "inside", and "outside" are based on the orientation or positional relations as shown in the drawings, only for facilitating description of the present disclosure and simplifying the description, rather than indicating or implying that the referred devices or elements must be in a particular orientation or constructed or operated in the particular orientation, and therefore they should not be construed as limiting the present disclosure. In addition, terms such as "first", "second", and "third" are used only for descriptive purpose, and should not be understood as indicating or implying importance in relativity.

In the description of the present disclosure, it should be indicated that unless otherwise expressly specified or defined, terms "mount", "couple", and "connect" should be understood broadly, and for example, it may be fixed connection, or detachable connection, or integrated connection; may be mechanical connection or electric connection; or may be direct connection, or indirect connection via an intermediate medium, or may be internal communication between two elements. The specific meanings of the above-mentioned terms in the present disclosure could be understood by a person skilled in the art according to specific situations.

The technical solutions of the present disclosure will be further explained below in combination with the specific implementations.

Figure 2:
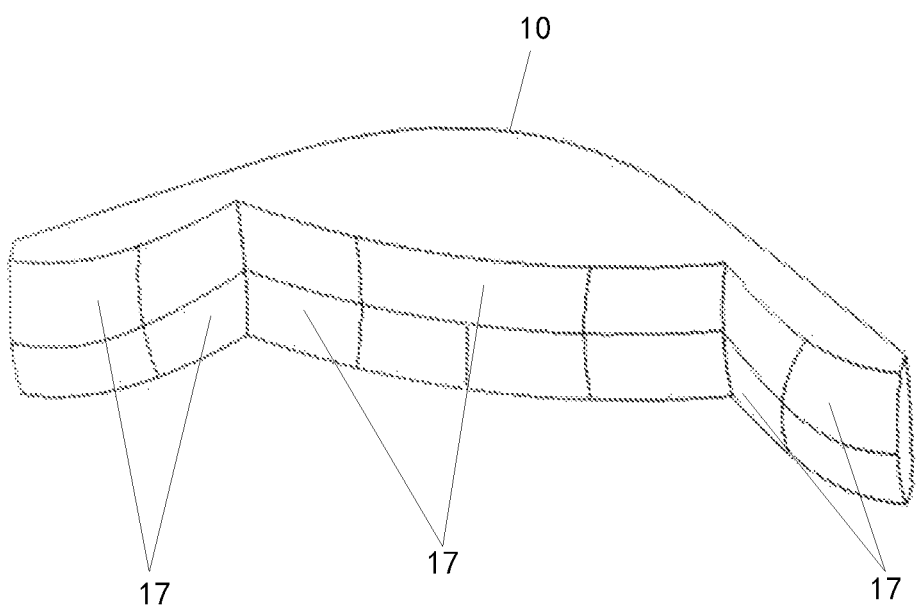
FIG. 2 is another structural schematic view of a lens structure provided by Embodiments of the present disclosure.
Figure 3:
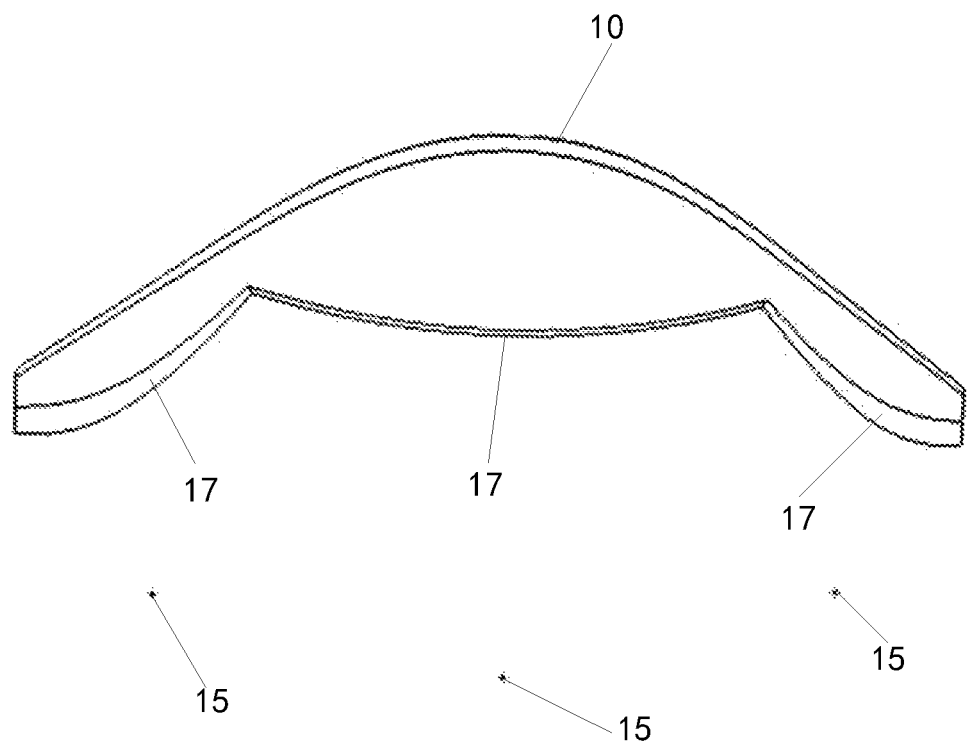
FIG. 3 is a detailed structural schematic view of a lens structure provided by Embodiments of the present disclosure.
Figure 4:
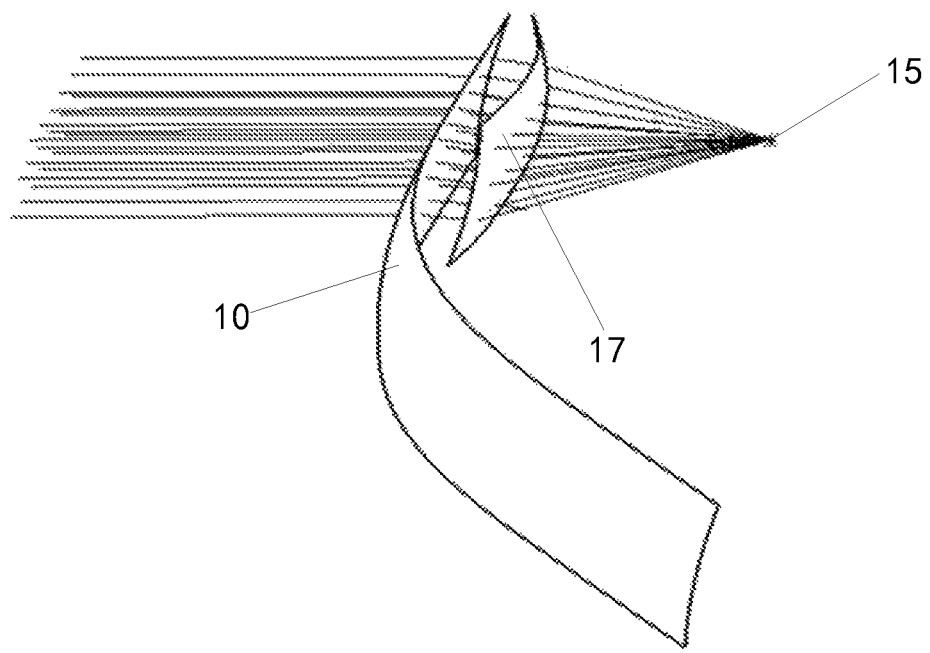
FIG. 4 is a schematic view showing a calculation principle for an inner curved surface of a lens structure provided by Embodiments of the present disclosure.
Figure 5:
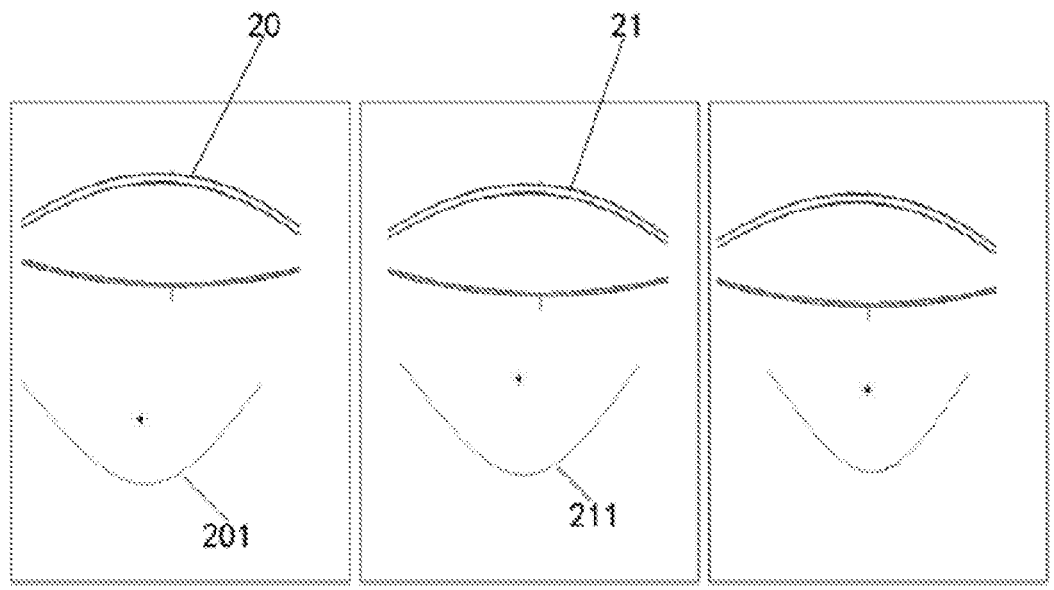
FIG. 5 is a functional structure schematic view of an existing lens structure.
Figure 6:
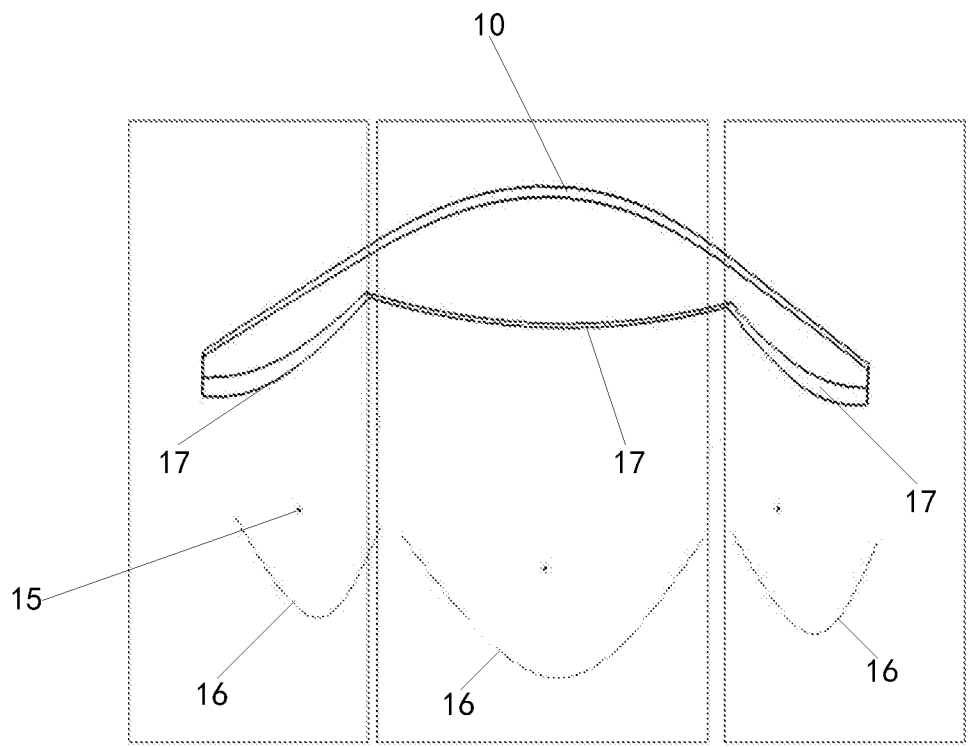
FIG. 6 is a functional structure schematic view of a lens structure provided by Embodiments of the present disclosure.

FIG. 1 is a structural schematic view of a lens structure provided by Embodiments of the present disclosure; FIG. 2 is another structural schematic view of a lens structure provided by Embodiments of the present disclosure; FIG. 3 is a detailed structural schematic view of a lens structure provided by Embodiments of the present disclosure; FIG. 4 is a schematic view showing a calculation principle for an inner curved surface of a lens structure provided by Embodiments of the present disclosure; FIG. 5 is a functional structure schematic view of an existing lens structure; and FIG. 6 is a functional structure schematic view of a lens structure provided by Embodiments of the present disclosure.

First Embodiment

As shown in FIG. 1 to FIG. 4 and FIG. 6, the lens structure provided by the embodiment includes a lens body.

An outer surface 10 of the lens body is provided as a single curved surface, and an inner surface 11 of the lens body is provided thereon with at least two inner curved surfaces 17 that are continuously connected.

In an alternative implementation of the above embodiment, specifically, as shown in FIG. 1, the outer surface 10 is an arc curved surface; the inner surface is provided thereon with three inner curved surfaces 17, and an radian of each inner curved surface 17 may be less than an radian of the outer surface 10; and of course, as actually required, an radian of each inner curved surface 17 may also be greater than or equal to an radian of the outer surface 10.

Optionally, as shown in FIG. 3 and FIG. 4, at least one inner curved surface 17 is determined according to one light source focal point 15. The number and position of the inner curved surface 17 is determined as specifically required by business, and one focal point is at least corresponding to one inner curved surface 17. Calculation principle for the inner curved surface 17 comprises: with known positions of a focal point and the outer surface 10 and with given light emitting direction, the inner curved surface 17 may be obtained according to the refraction principle and the curved surface fitting principle.

In order to meet the preset requirement of the lens, as shown in FIG. 2, it is further possible that a plurality of the inner curved surfaces 17 are arranged in multiple rows and columns.

In an alternative implementation of the above embodiment, as shown in FIGS. 1 to 3, the outer surface 10 of the lens body is an arc curved surface; the inner surface includes a first inner surface 12, a second inner surface 13 and a third inner surface 14; and the first inner surface 12, the second inner surface 13 and the third inner surface 14 form a shape of groove.

Specifically, as shown in FIGS. 1 to 3, the first inner surface 12 and the third inner surface 14 are provided symmetrically around a central axis of the second inner surface 13. Or, the first inner surface 12, the second inner surface 13 and the third inner surface 14 are arranged irregularly.

A surface area of the second inner surface 13 is greater than a surface area of the first inner surface 12 and a surface area of the third inner surface 14, respectively; and of course, for actual conditions, a surface area of the second inner surface 13 is less than a surface area of the first inner surface 12 and a surface area of the third inner surface 14, respectively.

In a specific implementation of the present embodiment, as shown in FIG. 1, FIG. 3, FIG. 4 and FIG. 6, the outer surface 10 of the lens body is provided as a single curved surface, and the inner surface of the lens body is provided thereon with at least two inner curved surfaces 17 that are continuously connected; the outer surface 10 is an arc curved surface; and the inner surface is provided thereon with three inner curved surfaces 17, and at least one inner curved surface 17 is determined according to one light source focal point 15. The number and position of the inner curved surface 17 is determined as specifically required by business, and one focal point at least is corresponding to one inner curved surface 17.

As shown in FIG. 5, for the existing lens structure, the high beam requires a lens, and the low beam requires a lens; and in a conventional structure, each function requires one lens structure. For example, corresponding to a first reflection surface 201, a first lens 20 provides a function, and corresponding to a second reflection surface 211, a second lens 21 provides another function, and so on, where one lens is corresponding to one function, which not only wastes space but also fails to allow flexible configuration of the light pattern, particularly affecting the shaping adaptability of the outer surface.

In the lens structure adopted by the embodiment, the outer surface 10 of the lens body is provided as a single curved surface; the inner surface 11 of the lens body is provided thereon with at least two inner curved surfaces 17 that are continuously connected; the outer surface 10 is a circular arc curved surface; the inner surface 11 is provided thereon with three inner curved surfaces 17; and at least one inner curved surface 17 is determined according to one light source focal point 15. The number and position of the inner curved surface 17 is determined as specifically required by business, where one focal point is at least corresponding to one inner curved surface 17. As shown in FIG. 6, with the design of multiple inner curved surfaces 17 in which each inner curved surface 17 is corresponding to one reflection surface 16 and each light source focal point 15 is at least corresponding to one inner curved surface 17, functions of the above-mentioned multiple existing lenses are achieved through one lens structure, which occupies less space and allows a flexible configuration of the light pattern.

In another disclosed specific implementation, an outer surface 10 of the lens body is provided as a single curved surface, and an inner surface of the lens body is provided thereon with at least two inner curved surfaces 17 that are continuously connected; and the lens body is in a shape of Yuanbao, and the outer surface 10 refers to an outer side surface and a bottom surface of Yuanbao, and the inner surface refers to an inner side surface of Yuanbao.

Further, the first inner surface 12 and the third inner surface 14 are each provided with N inner curved surfaces 17; and the second inner surface 13 is provided with M inner curved surfaces 17, where N and M are both positive integers greater than 1, and M is greater than N.

As shown in FIG. 2, in the embodiment, the inner surface is divided into a first inner surface 12, a second inner surface 13 and a third inner surface 14, and the first inner surface 12, the second inner surface 13 and the third inner surface 14 are each provided thereon with at least one inner curved surface 17. Specifically, the first inner surface 12, the second inner surface 13 and the third inner surface 14 are arranged irregularly; a surface area of the second inner surface 13 is greater than a surface area of the first inner surface 12 and a surface area of the third inner surface 14, respectively; and as shown in FIG. 2, the first inner surface 12 and the third inner surface 14 are each provided thereon with four inner curved surfaces 17 respectively, and the second inner surface 13 is provided thereon with seven inner curved surfaces 17. A combination is achieved where there are 15 inner curved surfaces 17 for the inner surface.

Please refer to FIG. 1 to FIG. 3. As an implementation, a lens structure includes a lens body. The lens body has an outer surface 10 and an inner surface 11 opposite to each other. The outer surface 10 is configured as a single curved surface; and the inner surface 11 is provided thereon with at least two inner curved surfaces 17.

Optionally, in the embodiment, the lens structure is configured such that light of the light source provided near the inner surface 11 passes through the outer surface 10 from the inner surface 11 (it should be pointed out that the inner curved surface 17 of the inner surface 11 is referred to here) of the lens structure, and then is emitted from the outer surface 10. Functions of a plurality of lenses in the prior art are thus achieved by a plurality of inner curved surfaces 17.

It can be understood that in other implementations of the present disclosure, the lens structure may also be configured such that light of the light source near the outer surface 10 passes through the inner surface 11 (it should be pointed out that the inner curved surface 17 of the inner surface 11 is referred to here) from the outer surface 10 of the lens structure, and then is emitted from the inner surface 11, which is only an example here.

As shown in figures, the inner surface 11 includes a plurality of sub-surfaces that are interconnected, and adjacent ones of the sub-surfaces have a preset included angle; and the sub-surface has at least one inner curved surface 17.

Further, the inner surface 11 includes at least three sub-surfaces that are interconnected, and adjacent ones of the sub-surfaces have a preset included angle; and a plurality of the sub-surfaces, in combination, form a groove recessed toward the outer surface 10. This allows the lens structure to have a better transmission effect.

In the implementation, the sub-surfaces refer to the first inner surface 12, the second inner surface 13 and the third inner surface 14.

It may also be seen from the figure that the sub-surfaces are each provided thereon with a plurality of inner curved surfaces 17 (as shown in FIG. 2).

Further, at least one inner curved surface 17 is determined according to one light source focal point 15 (as shown in FIG. 3).

In the implementation, a plurality of the inner curved surfaces 17 are arranged in multiple rows and columns.

It may also be seen from the figure that the outer surface 10 of the lens structure is an arc curved surface; and the arc curved surface protrudes in a direction away from the inner surface 11.

Second Embodiment

The Second Embodiment of the present disclosure provides a vehicle lamp system including the lens structure in any one of the technical solutions of the above-mentioned embodiments.

The lamp system provided by the Second Embodiment of the present disclosure is provided with the lens structure provided by the First Embodiment, and thus has all the beneficial effects of the lens structure provided by the First Embodiment, which will not be described repeatedly herein.

Specifically, in the vehicle lamp optical system for vehicles, PES lens is an extremely important component of the optical system, and the commonly used one is a single light source hyperboloid lens. It is difficult for the traditional lens structure design to meet the current complex requirement of light distribution. The lens structure provided by the present disclosure, in which the outer surface of the lens body is provided as a single curved surface and the inner surface of the lens body is provided thereon with at least two inner curved surfaces that are continuously connected, is capable of flexibly controlling the light pattern and the energy distribution, greatly improves the applicability of the lens design, and at the same time, provides a truly feasible solution to the defect where in some scenes it is impossible for the existing conventional structure to distribute light.

Multiple functions may be implemented at the same time, such as, low beam, high beam, bending, fog lamp and so on; and multiple functions are combined into one lens module for implementation.

It should be noted that bending refers to go curving or buckling. In the field of vehicle lamps, bending refers to the function of bend lighting.

In conclusion, the present disclosure provides a lens structure suitable for scenes with multi-curved surfaces and multi-light sources, which maximally achieves flexible control over the light pattern and energy, improves heat generation, optimizes the spatial structure, enhances the stability of the optical system, and especially ameliorates the defect where in some cases it is difficult for the traditional lens structure to implement light distribution.

Finally, it should be noted that the above embodiments are only used to illustrate the technical solutions of the present disclosure, rather than limiting the same; although the present disclosure has been described in detail with reference to the foregoing embodiments, a person ordinary skilled in the art should understand that the technical solutions described in the foregoing embodiments may be still modified or equivalent replacements may be made to some or all of the technical features; and these modifications or replacements do not deviate the essence of the corresponding technical solutions from the scope of the technical solutions of the embodiments of the present disclosure. In addition, a person skilled in the art can understand that although some embodiments described herein include some features included in other embodiments rather than other features, a combination of features of different embodiments is meant to be within the scope of the present disclosure and form different embodiments. For example, in the following claims, any one of the claimed embodiments may be used in any combination. The information disclosed in the Background Art section is only intended to understand better the general background art of the disclosure and should not be construed as an acknowledgement or any form of suggestion that the information forms a prior art that is already known to a person skilled in the art.

INDUSTRIAL APPLICABILITY

The lens structure provided by embodiments of the disclosure, in which an outer surface of the lens body is provided as a single curved surface and an inner surface of the lens body is provided thereon with at least two inner curved surfaces that are continuously connected, is capable of controlling flexibly the light pattern and the energy distribution. Such a lens structure is suitable for scenes with multi-curved surfaces and multi-light sources, which lens structure is capable of effectively improving heat generation, optimizing the spatial structure, enhancing the stability of the optical system, and especially ameliorating the defect where in some cases it is difficult for the traditional lens structure to implement light distribution. Further, through the design of multiple inner curved surfaces in which each inner curved surface is corresponding to one reflection surface and each light source focal point is at least corresponding to one inner curved surface, functions of the lens in the prior art are achieved through one lens structure, which occupies less space and allows a flexible configuration of the light pattern.

The invention claimed is:

1. A lens structure, comprising:
   a lens body, wherein an outer surface of the lens body is provided as a single curved surface, and an inner surface of the lens body is provided thereon with at least two inner curved surfaces that are continuously connected,
   wherein the lens body is in a shape of a Chinese shoe-shaped gold/silver ingot, the outer surface consists of an outer side surface and a bottom surface of the Chinese shoe-shaped gold/silver ingot, and the inner surface is an inner side surface of the Chinese shoe-shaped gold/silver ingot,
   wherein the inner surface is divided into a first inner surface, a second inner surface and a third inner surface, and the first inner surface, the second inner surface and the third inner surface are each provided thereon with at least one inner curved surface.

2. The lens structure according to claim 1, wherein the outer surface is an arc curved surface, and the inner surface is provided thereon with three inner curved surfaces.

3. The lens structure according to claim 2, wherein a radian of each of the inner curved surfaces is less than a radian of the outer surface.

4. The lens structure according to claim 1, wherein at least one of the inner curved surfaces is determined according to one light source focal point.

5. The lens structure according to claim 4, wherein a plurality of the inner curved surfaces are arranged in multiple rows and columns.

6. The lens structure according to claim 1, wherein the outer surface of the lens body is an arc curved surface;
   the inner surface comprises a first inner surface, a second inner surface, and a third inner surface; and the first inner surface, the second inner surface, and the three inner surface form a groove.

7. The lens structure according to claim 6, wherein the first inner surface and the third inner surface are provided symmetrically around a central axis of the second inner surface; or, the first inner surface, the second inner surface, and the third inner surface are arranged irregularly.

8. The lens structure according to claim 7, wherein a surface area of the second inner surface is greater than a surface area of the first inner surface and a surface area of the third inner surface, respectively; or the surface area of the second inner surface is less than the surface area of the first inner surface and the surface area of the third inner surface respectively.

9. The lens structure according to claim 1, wherein the first inner surface, the second inner surface, and the third inner surface are arranged irregularly; and
a surface area of the second inner surface is greater than a surface area of the first inner surface and a surface area of the third inner surface, respectively.

10. The lens structure according to claim 9, wherein the first inner surface and the second inner surface are each provided with N inner curved surfaces; and
the second inner surface is provided with M inner curved surfaces,
wherein N and M are both positive integers greater than 1, and M is greater than N.

11. A vehicle lamp system, comprising the lens structure according to claim 1.

12. A lens structure, comprising:
a lens body,
wherein the lens body has an outer surface and an inner surface opposite to each other; and the outer surface is configured as a single curved surface, and the inner surface is provided thereon with at least two inner curved surfaces,
wherein the lens body is in a shape of a Chinese shoe-shaped gold/silver ingot, the outer surface consists of an outer side surface and a bottom surface of the Chinese shoe-shaped gold/silver ingot, and the inner surface is an inner side surface of the Chinese shoe-shaped gold/silver ingot,
wherein the inner surface is divided into a first inner surface, a second inner surface and a third inner surface, and the first inner surface, the second inner surface and the third inner surface are each provided thereon with at least one inner curved surface.

13. The lens structure according to claim 12, wherein the inner surface includes a plurality of sub-surfaces that are interconnected, and adjacent sub-surfaces have a preset included angle; and
each sub-surface has at least one inner curved surface.

14. The lens structure according to claim 13, wherein the inner surface includes at least three sub-surfaces that are interconnected, and adjacent sub-surfaces have a preset included angle; and
a plurality of the sub-surfaces, in combination, form a groove recessed toward the outer surface.

15. The lens structure according to claim 14, wherein the sub-surfaces are each provided thereon with a plurality of inner curved surfaces.

16. The lens structure according to claim 12, wherein at least one of the inner curved surfaces is determined according to one light source focal point.

17. The lens structure according to claim 16, wherein a plurality of the inner curved surfaces are arranged in multiple rows and columns.

18. The lens structure according to claim 12, wherein the outer surface is an arc curved surface; and
the arc curved surface protrudes in a direction away from the inner surface.

* * * * *